United States Patent [19]

Rodish

[11] 4,358,332

[45] Nov. 9, 1982

[54] APPARATUS FOR COATING PAPER WITH A PLASTIC PATTERN

[75] Inventor: John Rodish, Ft. Wright, Ky.

[73] Assignee: Polynovus Industries, Inc., Ft. Wright, Ky.

[21] Appl. No.: 235,930

[22] Filed: Feb. 19, 1981

Related U.S. Application Data

[62] Division of Ser. No. 88,862, Oct. 29, 1979, abandoned.

[51] Int. Cl.$^3$ ............................................... B29D 7/02
[52] U.S. Cl. ..................................... 156/356; 118/313; 118/670; 118/677; 156/244.21; 156/244.25; 156/244.27; 156/357; 156/363; 156/498; 156/500
[58] Field of Search .............. 156/243, 244.11, 244.21, 156/244.25, 244.27, 285, 290, 291, 296, 352, 356, 357, 363, 378, 498, 500, 501; 264/75, 212, 245, 511, 571, 101; 427/288, 294; 425/465, 504; 118/313, 326, 670, 677

[56] References Cited

U.S. PATENT DOCUMENTS

| | | | |
|---|---|---|---|
| 3,043,738 | 7/1962 | Demeter et al. | 156/244.21 |
| 3,165,432 | 1/1965 | Plaskett | 156/285 |
| 3,247,039 | 4/1966 | Schultheiss | 156/244.25 |
| 3,331,728 | 7/1967 | Lane | 156/285 |
| 3,421,964 | 1/1969 | Arbit | 156/244.21 |
| 3,449,187 | 6/1969 | Bobkowicz | 156/244.21 |
| 3,616,018 | 10/1971 | Kromoly | 156/244.24 |
| 3,659,338 | 5/1972 | McFarlane | 156/244.25 |
| 3,765,809 | 10/1973 | Farrell | 156/501 |
| 4,042,740 | 8/1977 | Krueger | 156/244.21 |
| 4,259,924 | 4/1981 | Smith | 118/313 |

FOREIGN PATENT DOCUMENTS

2263624 12/1972 Fed. Rep. of Germany .

*Primary Examiner*—Caleb Weston
*Attorney, Agent, or Firm*—Hauke and Patalidis

[57] ABSTRACT

A method and apparatus for applying to a surface of a continuous travelling web of paper a regular mesh-like pattern of thermoplastic stripes or strands. The plastic stripes or strands are extruded from nozzles supported a short distance above the travelling web of paper, the nozzles being disposed at the bottom of extrusion heads oscillating transversely to the direction of travel of the web of paper. While the pattern of plastic stripes or strands is applied to a surface of the paper, a vacuum or suction plate disposed against the other surface of the paper draws the plastic through the pores of the paper. The web of paper is subsequently passed through a pair of compression rolls and is air-dried. Additional extrusion nozzles may be provided, which are held stationary such as to apply to the surface of the travelling web of paper longitudinal strands or stripes of plastic at an appropriate distance from each other such, for example, as to correspond to the four corners of a reinforced paper bag, subsequently manufactured from the web of paper using conventional paper bag making machinery.

9 Claims, 8 Drawing Figures

APPARATUS FOR COATING PAPER WITH A PLASTIC PATTERN

This is a division of application Ser. No. 088,862, filed Oct. 29, 1978, abandoned.

BACKGROUND OF THE INVENTION

The invention relates to a method and apparatus for providing a substrate such as a textile fabric or a paper sheet with a mesh-like pattern of reinforcing plastic stripes or strands. The invention has particular usefulness for reinforcing paper used for manufacturing articles-carrying paper bags.

Carry-out paper bags are convenient to assist customers in carrying out purchases made from grocery stores, market stores, liquor stores, hardwares and the like. The inconveniences of ordinary carry-out paper bags are many and well-known. They have limited load carrying capacity, they are easily punctured or torn by the sharp corners of the articles carried and, if exposed to wet or sweating surfaces, they tear very easily. The load carrying capacities of ordinary paper bags are so poor that it is often best to place two or more bags within each other before filling them with heavy articles, such as bottles and the like, and it is a good precaution for the customer to carry a loaded bag by holding it under its bottom panels rather than by grasping it at the top of its side panels.

It would therefore be advantageous to provide ordinary carry-out bags made of paper, such as the kraft or sulfate paper commonly used for making such bags, with a greatly improved load carrying capacity without substituting heavy-weight for light-weight kraft stock, without resorting to using two light-weight kraft paper blanks formed together in the form of a multi-layer bag called a "Duplex" bag, and without being subjected to almost immediate self destruction when wet.

Attempts have been made in the past at reinforcing paper or at providing reinforced paper shopping bags. For example, in U.S. Pat. No. 3,248,041 there is disclosed a reinforced multi-wall bag, in U.S. Pat. No. 2,653,090 there is disclosed a glass strand reinforced paper, and in German Patent Publication 2,263,624 there is disclosed a bag provided with reinforcing extruded plastic strands arranged laterally across each side of the bag proximate the carrying handle attached to the top of each bag side.

It is readily apparent that a reinforced multi-wall bag is relatively complex, costly to manufacture, and offers no savings in the tonnage of paper used for manufacturing a given number of bags, that duplex bags made of two light-weight kraft paper sheets formed together in the form of a bag do not provide improved strength as compared to a bag made of a single sheet of heavy-weight kraft paper, that glass strand reinforced paper wherein, the glass strand is embedded in the center of the mass of paper fiber, requires that the glass strands be first made and be subsequently immersed in the paper pulp during the paper manufacture operation, and that forming reinforcing strands in a lateral direction across the sides of a bag has very little effect on increasing the load-carrying capacity of a paper bag, especially when wet.

In copending application Ser. No. 088,863, filed on the same day as the present application, now U.S. Pat. No. 4,301,961, there is disclosed a plastic reinforced paper which is obtained without changing paper making techniques, without modification of paper making machinery other than the addition of the relatively simple and low cost plastic reinforcement applying unit for practicing the method of the present invention, without modification of bag making machinery presently existing, and without reduction in production rate. By using the reinforced paper disclosed in the aforementioned application, paper bags having a substantial load-carrying capacity can be made from a substantially light-weight kraft paper, thus considerably reducing the tonnage of raw material and the energy cost required for manufacturing paper bags.

SUMMARY OF THE PRESENT INVENTION

The principal object of the present invention is to provide a method and apparatus for coating a surface of a linearly displaced web of paper or other substrate material with a regular mesh-like pattern of plastic reinforcing stripes or strands, preferably diamond-shaped or lozenge-shaped, which increases the tensile strength of the substrate in a lateral as well as longitudinal direction, the stripes or strands of extruded plastic material being embedded at least partially through the thickness of the substrate. The invention further provides longitudinal reinforcing stripes or strands of plastic coating on paper which is used for making bags and which provide reinforcement of the corners of the bags.

The present invention takes the form of a self-contained unit for incorporation at the end of a paper manufacturing line, for example, or at the beginning of a paper bag manufacturing line without any modification of the paper or bag manufacturing equipment. Alternatively, the plastic applicator unit of the invention may be used as a separate apparatus for custom reinforcing of textile or paper supplied in continuous webs of great length for ulterior use to manufacture a finished product.

The many objects and advantages of the present invention will become apparent to those skilled in the art when the following disclosure of the best mode contemplated for practicing the invention is read in conjunction with the accompanying drawing wherein like numerals refer to like or equivalent parts and in which:

BRIEF DESCRIPTION OF THE DRAWING

FIG. 4 is a partial sectional view thereof from line 4—4 of FIG. 3;

FIG. 7 is a partial top plan view from line 7—7 of FIG. 2; and

FIG. 8 is a partial section along line 8—8 of FIG. 7.

DETAILED DESCRIPTION OF THE PREFERRED EMBODIMENTS

Figure 1:
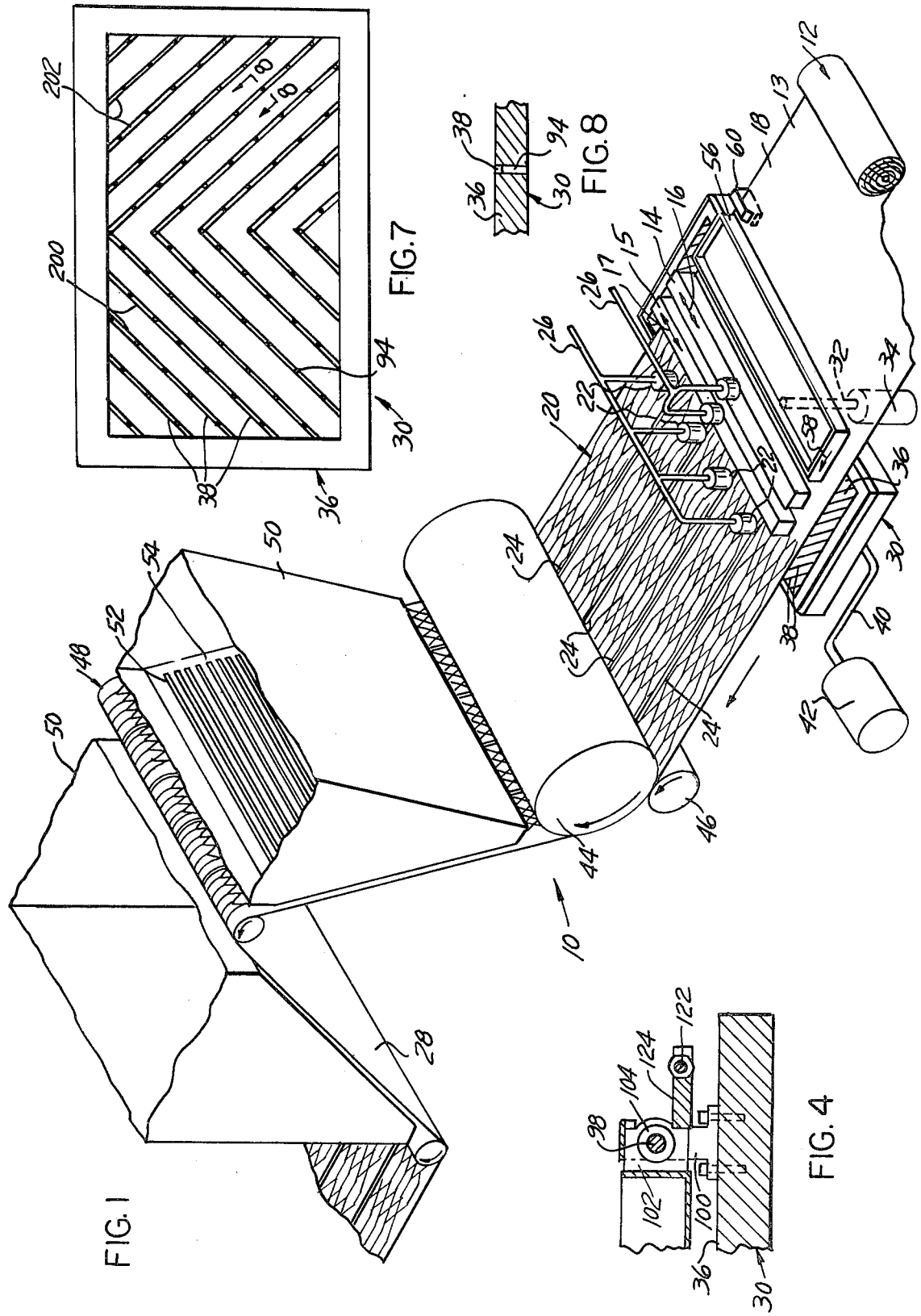
FIG. 1 is a schematic perspective diagram of a paper reinforcing plastic pattern applying apparatus according to the present invention.

Referring to FIG. 1 of the drawing, there is illustrated in a schematic and diagrammatic manner a paper coating apparatus 10, according to the invention, installed in a paper bag making line between the paper supply roll 12, from which a continuous web 13 of paper is obtained, and a conventional bag making machine, not shown, disposed downstream from the coating apparatus 10. The web 13 of paper is caused to travel under a pair of extrusion nozzle heads 14 and 15 which are oscillated transversely to the direction of travel of the web 13 of paper, as indicated by the arrows 16 and 17. The transverse oscillation of the nozzle heads 14 and 15, which are each provided with a plurality of extrusion nozzles, not shown, disposed above the surface 18 of the web 13 of paper, causes fine stripes or strands of molten plastic extruded from the nozzles to be applied on the surface 18 of the web of paper in the form of a mesh-like diamond- or lozenge-shaped pattern 20. A plurality of stationary nozzles 22, four in number in the example illustrated, apply to the surface 18 of the web 13 of paper longitudinally aligned parallel straight stripes or strands 24 of extruded plastic. The oscillating extrusion heads 14 and 15 and the stationary extrusion nozzles 22 are supplied through appropriate lines 26, preferably flexible lines, with a liquid thermoplastic resin obtained from an extruder, not shown.

Disposed below the travelling web 13 of paper, in engagement with the lower surface 28 of the paper web 13, a vacuum table or plate 30 is supported on the end of the linearly reciprocable rod 32 of a hydraulic or air cylinder 34. The vacuum table 30 can thus be raised to a working position with its top surface 36 in engagement with the lower surface 28 of the travelling web 13 of paper or away to a disengaged position. The top face 36 of the vacuum table 30 is provided with a plurality of grooves 38 at the bottom of which are disposed orifices connected through a line 40 to the inlet of a suction pump 42, such that suction is applied to the lower face 28 of the web 13 of paper for drawing through the pores of the paper substrate the molten plastic material forming the deposited pattern 20 and the parallel stripes 24.

A pair of pinch rollers 44 and 46 are disposed downstream of the coating operation station, one of the pinch rollers, for example the pinch roller 46 being driven such as to continuously pull the web 13 of paper from the roll 12 under the plastic applicator nozzles. The peripheral surface of the pinch roller 46 is preferably provided with a layer of elastomeric material in engagement with the uncoated surface 28 of the paper, and firmly applying the coated surface 18 against the peripheral surface of the roller 44, which is preferably made of polished steel and which is free rolling. The pinch rollers 44 and 46 may be of the same size and they may be both power-driven. The pinch rollers 46 and 44 thus act as compression rolls which further forces the strands or stripes of still relatively soft plastic coating the surface 18 of the paper web 13 through the mass of the paper substrate.

In installations wherein the coating apparatus 10 is disposed in a paper bag making line, upstream of the bag making apparatus, the pinch rollers 44 and 46 are free wheeling. The paper feeding mechanism of the bag making apparatus being utilized to feed the web 13 of paper through the coating apparatus.

The continuous travelling web 13 of paper is, after passage between the compression rolls 44 and 46, subjected to forced air cooling by being fed through a cooling unit 48 consisting of, for example, a pair of plenum chambers 50 into which atmospheric air is fed, by a blower, not shown, the air flowing into the plenum chambers 50 being ejected through slots 52 in a sidewall 54 of each chamber disposed in close proximity to the travelling web 13 of paper. Cooling causes the plastic stripes on the surface of the paper to set, and the plastic having been drawn into the mass of the paper through the pores and between the fibers of paper to also set and literally fuses with the paper fibers. After passage through the cooling unit 48, the web 13 of paper is fed to a conventional bag making machine, for example, or is re-rolled for ulterior use.

The paper coating apparatus 10 further comprises a catch pan 56, mounted normally out of contact above the paper web 13 and upstream of the oscillating extrusion nozzle heads 15 and 14. The catch pan 56 is appropriately supported from each side of the top 36 of the vacuum table 30 and is arranged to be displaced by a fluid cylinder, not shown at FIG. 1, in the direction of the arrow 58 in the event that the web 13 of paper breaks off, the break being detected by a detector 60, such as an infrared light-photocell detector, an ultrasonic wave transmitter and detector, or the like. Upon detection of a break in the paper by the detector 60, the vacuum table 30 is dropped by the fluid cylinder 34, while simultaneously the catch pan 56 is displaced in the direction of the arrow 58 under the stationary nozzles 22 and the nozzle heads 14 and 15, while the extrusion operation and the feeding of the paper is immediately stopped. The catch pan 56 catches any molten plastic dripping from the extrusion nozzles and protects the top 36 of the vacuum table 30, thus preventing the grooves 38 and the orifices on the top 36 of the vacuum table from being clogged with plastic dripping from the extrusion nozzles.

Figure 2:
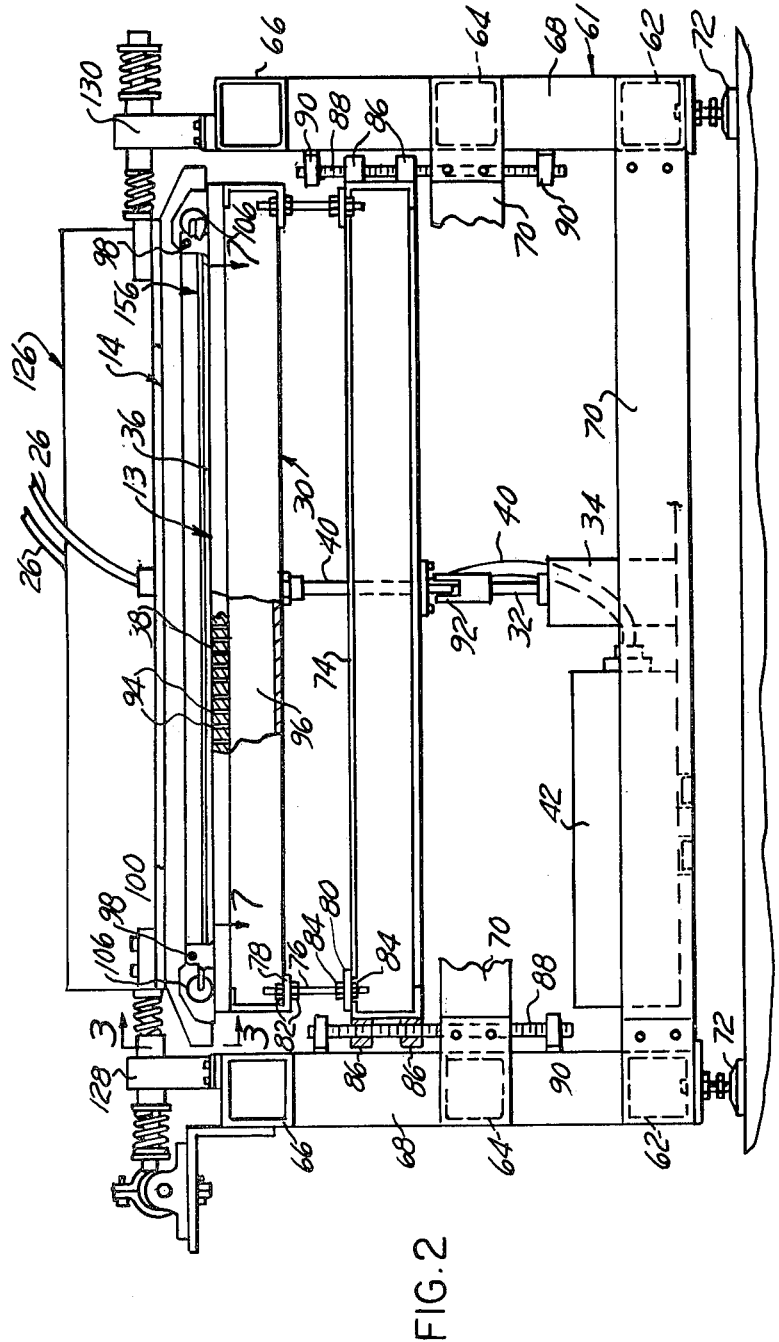
FIG. 2 is a partial front elevation view of the apparatus of FIG. 1.

Referring now to FIG. 2, which is a partial front elevational view of the paper coating apparatus 10, it is readily apparent that the apparatus is provided with a support frame 61 made of substantially parallel longitudinal lateral lower channel members 62, longitudinal lateral intermediate channel members 64 and longitudinal lateral upper channel members 66, the lateral channel members being interconnected by upright channel members 68. Reinforcing cross-channel members 70 extend transversely from one upright channel member 68 on one side of the frame 61 to the other on the appropriate side. Additional transversely extending channel members, not shown, are provided at appropriate intervals to interconnect the longitudinal lateral channels 62, 64 and 66. The frame 61 is built up by welding or bolting together the diverse longitudinal channel members, upright and transverse cross-channel members in a conventional manner well-known in the art, and the frame 61 is supported by appropriate height adjustable feet 72 for proper and accurate levelling in spite of uneven flooring.

The vacuum table 30 is supported from an elevator yoke 74 disposed substantially parallel to the vacuum table 30 and which supports the vacuum table 30 by means of four threaded posts 76, each disposed at a corner of the bottom of the vacuum table 30 and at a corresponding corner of the elevator yoke 74. The length of the threaded posts 76 is adjustable as a result of each end of each post 76 being passed, respectively, through an aperture in a bracket 78 welded at the corner of the bottom of the vacuum table 30 and through an aligned aperture in a bracket 80 similarly welded at the corner of the elevator yoke 74. A pair of nuts 82 threading on the threaded end of the rods 76 each on one side of the bracket 78 and a pair of similarly disposed nuts 84 threading on the other threaded end of the rods each on one side of the bracket 80 permit to level the vacuum table 30 relative to the elevator yoke 74 at any appropriate distance within a predetermined range of adjustment.

The elevator yoke 74 is slidably disposed for vertical motion by being provided at each corner with a pair of bushings 86 disposed one above the other and adapted to slide over a post 88 held at each end to one of the upright channel members 68 by way of a bracket 90. Four of such slide assemblies consisting each of a post 88 and a pair of bushings 86 are provided, one at each corner of the elevator yoke 74.

The hydraulic or air cylinder 34 is disposed below the elevator yoke 74, substantially aligned with its center of gravity, and the reciprocable rod 32 of the hydraulic or air cylinder 34 is fastened to the bottom of the elevator yoke 74 by way of a coupling bracket 92.

The top plate 36 of the vacuum table 30 is provided with a plurality of apertures 94 placing the grooves 38 formed on the surface of the top plate 36 in communication with the interior of the vacuum table 30 forming a suction plenum chamber 96. The suction plenum chamber 96 is placed in communication with the vacuum pump 42 through an appropriate line in the form of a flexible hose 40.

Figure 3:
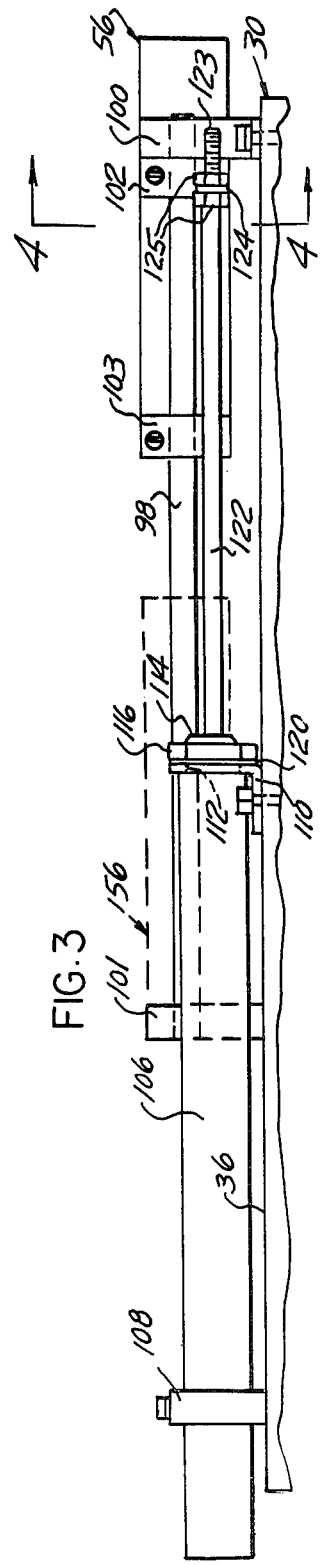
FIG. 3 is a partial side elevation view from line 3—3 of FIG. 2.

The catch pan 56 is mounted above the vacuum table top plate 36, at the leading edge of the plate, and is supported from the top 36 of the vacuum table 30 by way of a pair of laterally disposed parallel slide rods 98 supported parallel to the top plate 36 of the vacuum table 30 each by a front support clamp post 100 and a rear support clamp post 101. As best shown at FIGS. 3–4, the catch pan 56, which is in the form of a rectangular open top pan, is supported slidable along the slide rods 98 on each side by a pair of saddle bearing boxes 102 and 103 each provided with a cylindrical bushing 104 having as bore slidably feeding the slide rod. A hydraulic or air cylinder 106, and preferably two such cylinders 106, FIG. 2, are mounted, each along each lateral edge of the vacuum table top plate 36 by means of a rear clamp-like mount 108 and a front support bracket 110 having an aperture 112 through which is passed the threaded reduced diameter front portion 114 of the cylinder 106, an appropriate nut 116 and a washer 120 being passed over the threaded end 114 of the cylinder for fastening the front portion of the cylinder to the front support bracket 120. The reciprocating piston rod 122 of the cylinder 106 is attached at its threaded end 123, by means of a pair of nuts 125 to a bracket 124 fastened to the side of the catch pan 56. In this manner, the catch pan 56 is capable of being longitudinally displaced by the fluid cylinder 106 from the position shown in full line at FIG. 3 to the position shown in phantom line. The position shown in phantom line corresponds to a position occupied by the catch pan 56 directly below the applicator nozzle heads 14 and 15 and the stationary nozzles 22, FIG. 1, which occurs automatically, while the suction table 30 is simultaneously dropped away from the nozzles under the action of the fluid cylinder 34, FIG. 2, dropping the elevator yoke 74, when the detector 60, FIG. 1, detects a break in the web 13 of paper. The full hydraulic or compressed air systems, including solenoid actuated valves, connecting lines and accumulators, is not illustrated, as such an arrangement is well known in the art. In addition, individual manual controls permit to elevate or retract the vacuum table 30 and to displace the catch pan 56, during setup or warming up of the apparatus, and to return the diverse movable elements to their mutual co-operating position during normal operation of the apparatus.

Figure 6:
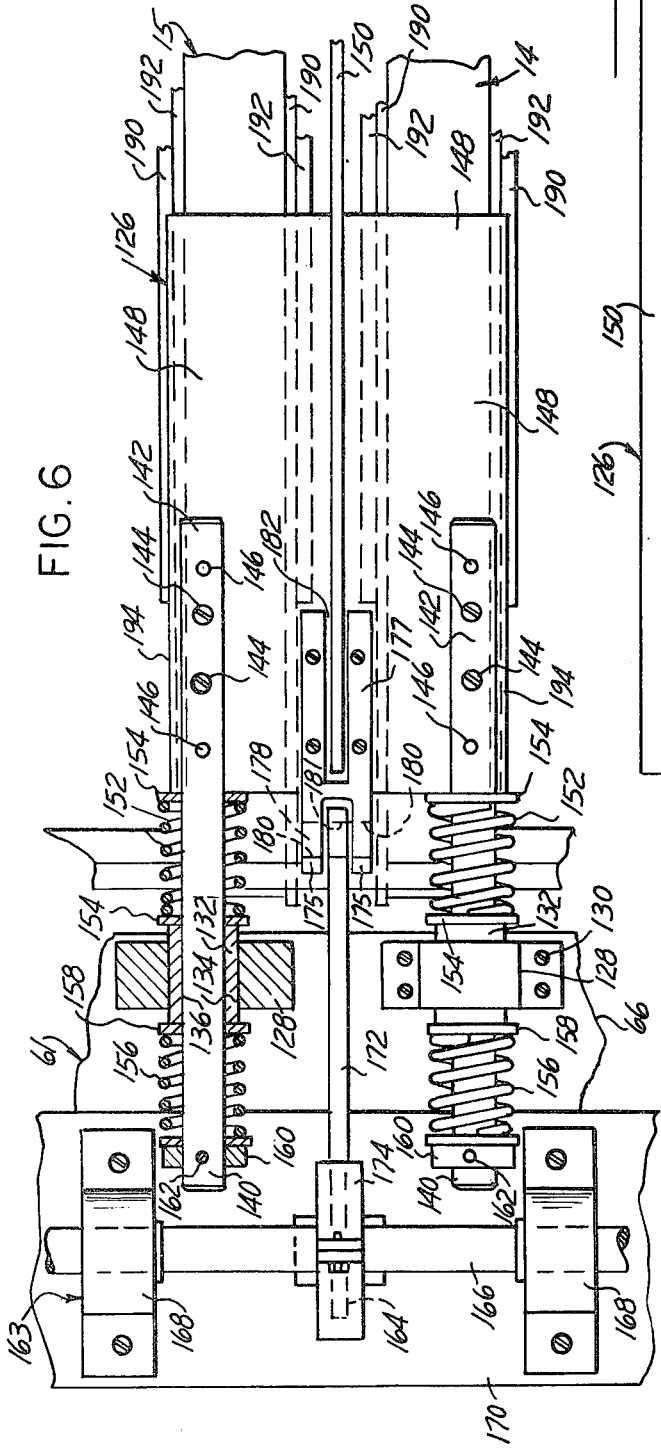
FIG. 6 is a partial top plan view thereof from lines 6—6 of FIG. 5, with portions cut-away.
Figure 5:
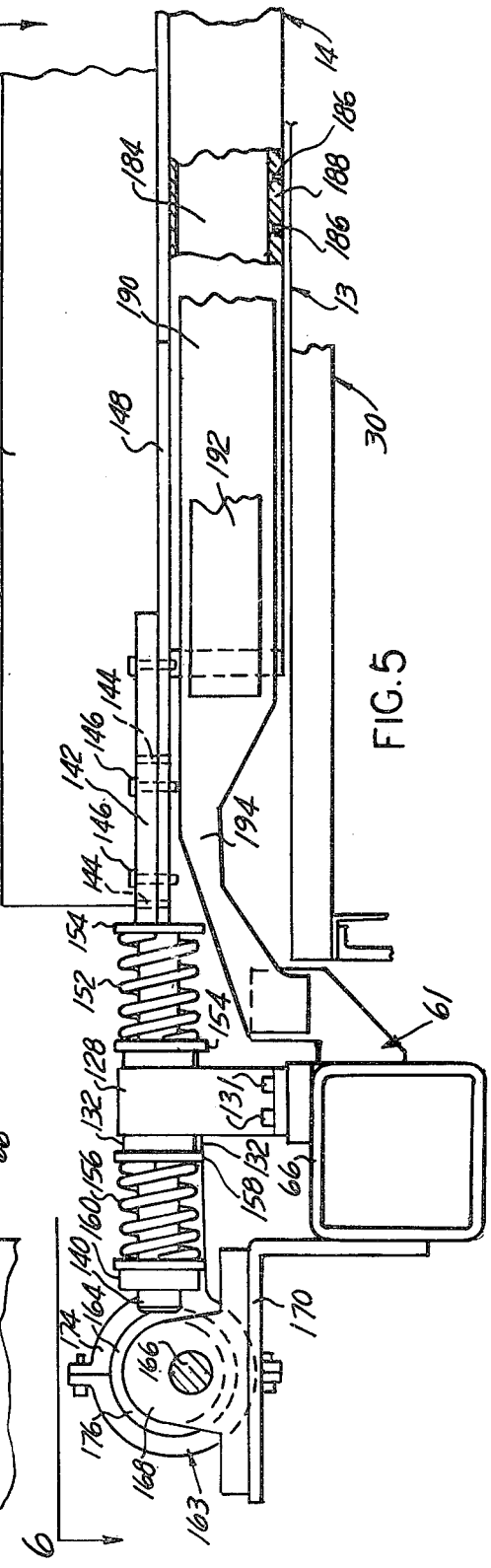
FIG. 5 is a partial front view of a detailed example of structure for the oscillating extrusion nozzles forming part of the apparatus of the invention, with portions cut-away.

The oscillating plastic applicator heads 14 and 15 are rigidly supported by a support bridge member 126 in turn supported for lateral limited motion from two pair of linear bearing support members 128 and 130, each pair of linear bearing members 128 or 130 being mounted on the top of a longitudinal lateral channel member 66, as shown at FIG. 2 and as best shown in detail at FIGS. 5–6, which illustrate the support structure for the bridge member 126 and the driving means for oscillating the bridge member, disposed on one of the sides of the apparatus frame 61. It will be readily appreciated that the bridge member support structure disposed on the other side of the apparatus frame 61 for supporting the other end of the bridge member is a mirror image of the structure illustrated at FIGS. 5–6, without the accompanying oscillation drive means.

As illustrated at FIGS. 5–6, the linear bearing support members 128 are mounted on the frame member 66 by way of bolts 131 and are each provided with a bushing 132 pressed in an appropriate bore 134 in the support member 128. The bore 136 of the bushing 132 slidably supports a rod 140. One end of the rod 140 is machined flat, as shown at 142 and is fastened by means of locating pins 144 and mounting bolts 146 to a horizontally disposed support plate 148. A cross-plate 150 is welded at right angle to the upper surface of the support plate 148 and extends, as shown at FIG. 2, transversely across and above the vacuum table 30. The extrusion nozzle heads 14 and 15 are mounted parallel and spaced apart below the support plate 148, the extrusion nozzle heads 14 and 15 being thus mounted at each end attached below such a support plate 148, and each support plate 148 being in turn fastened, preferably by welding, to the lower edge of the cross-plate 150, at one end of the cross-plate 150.

Between the lateral edge of the support plate 148 and the right-hand end of the bushing 132, as seen in the drawing, a helical spring 152 is disposed around the periphery of the rod 140 between a pair of retainer washers 154. Another helical spring 156 is disposed around the end of the rod 140 projecting through the bushing 132 between a retaining washer 158 and a retainer ring 160 disposed proximate the end of the rod 140. The retainer ring 160 is held in position by any convenient means such as a pin 162 diametrically press-fitted through appropriate aligned radial bores in the retainer ring 160 and a diametrically disposed bore through the rod 140. It can thus be seen that the support bridge member 126 is free to oscilate laterally longitudinally, that is transversely to the direction of travel of the web 13 of paper, by compressing one of the helical springs 152 or 156 according to the direction of oscillation. The helical springs 152 and 156 have for a purpose to cushion and absorb the inertia forces when the bridge member 126, supporting the extrusion heads 14 and 15 mounted under the support plates 148, is caused to reciprocate when driven by an oscillating drive mechanism 163. The oscillatory drive mechanism 163 comprises a cam 164 keyed on a camshaft 166 extending along the top of the side of the frame 61 and journaled in pillowboxes 168 mounted on an angle bracket support platform 170 bolted or welded to the exterior side of the longitudinal lateral top channel member 66. The camshaft 166 is driven from the driveshaft of a motor, not shown, driving the pinch rollers 44 and 46, FIG. 1, by means of an appropriate gearing such that the rotation of the camshaft 166 is coordinated in an appropriate ratio with the rotation of the pinch rollers 44 and 46. Alternatively, the camshaft 166 is driven by the electric motor feeding the web of paper through the bag making apparatus in in-line paper bag making installations. The cam 164 reciprocates a connecting rod 172 having a large end 174 provided with a bearing 176 rotatably accepting the cam 164. The cam 164 is in the form of a cylindrical crank throw rotating eccentric relative to the axis of rotation of the camshaft 166. The other end of the connecting rod 172 is pivotably mounted between the bifurcated ends 175 of a bracket 177, mounted on the top of the support plate 148, by means of a pin 178 passing through aligned bores 180 disposed in the bifurcated ends 175 of the bracket 177 and a bore 181 through the end of the connecting rod 172. The bracket 177 is provided with a slot 182 clearing the vertical plate 150 of the bridge member 126.

The support bridge member 126 and the extrusion heads 14 and 15 supported by the bridge member are thus oscillated laterally as driven by the cam 164 through the connecting rod 172, with the result that liquid plastic extruded from a plenum chamber 184 through a plurality of extrusion nozzles 186 through an extrusion die plate 188, is applied on the surface 18 of the web 13 of paper, travelling under the extrusion dies, forming the pattern 20 of plastic stripes or strands, FIG. 1. The location of the extrusion nozzles 186 through the applicator extrusion die plate 188 of the extrusion head 14 and the location of the extrusion nozzles through the extrusion die plate of the extrusion head 15 are arranged such that a closed mesh pattern 20, as illustrated at FIG. 1, is applied to the surface of the travelling web of paper.

Extending on both sides of each applicator extrusion head 14 or 15 there is an electrical heater strip 190 mounted on a side of a plate 192 and supported from the frame of the apparatus by a support arm 194 formed integrally at the end of the plate 192. Prior to starting the apparatus of the invention, the heated heater strip support plates 192 are engaged with the lateral surface of each applicator extrusion head 14 or 15 for pre-heating the extrusion dies 188 and the plenum chambers 184 to prevent the hot liquid plastic being fed to the plenum chambers from solidifying and clogging the extrusion nozzles 186. During operation of the apparatus, and while the extrusion heads 14 and 15 are caused to oscillate, the heated heater strip plates 192 are displaced away from the extrusion heads by a cam arrangement, not shown, spreading the support arms 194 of each pair of heater strip support plates 192 apart from one another, and the heater strips 190 are turned off.

As shown at FIGS. 7-8, the top plate 36 of the vacuum table 30 is provided with a plurality of grooves 38 arranged in two groups 200 and 202, the grooves 38 of each group being parallel to each other and disposed at an angle to the direction of translation of the web of paper. The grooves 38 of one group are disposed substantially at right angle to the grooves 38 of the other group, and the grooves of one group which intersect the grooves of the other group form a continuous groove, V-shaped in plan view, with its apex disposed along the centerline of the vacuum table top plate 36. In this manner, every portion of the lower surface of the travelling web of paper is caused to pass over the grooves 38, and suction is applied to the lower surface of the paper through the orifices 94 situated at the bottom of each groove. Alternatively, the grooves 38 may be rectilinear from one end to the other and, preferably, disposed parallel at an angle to the direction of translation of the web.

Polyolefin resins, such as polyethylene and polypropylene, have been found particularly convenient as a thermoplastic material for reinforcing paper according to the present invention in view of the facility with which polyolefin resins are hot-extruded and in view of their lack of brittleness, once set, which permits the reinforced paper to be folded without breaking the reinforcing plastic stripes or strands which are relatively pliable. It will be readily apparent however that the method and apparatus of the invention are well suited for reinforcing other types of substrates, besides paper, and by so reinforcing paper, textiles and like materials, many articles may be manufactured using a lower grade or thinner gage of paper or textile material.

As an example of applications of the present invention to the manufacture of grocery bags, grocery bags of 1/6 bbl. capacity are conventionally made from 65-75 lb. weight kraft paper, weighing 21.66 lbs. to 25 lbs. per thousand square feet. Approximately the same weight of base paper is used for manufacturing a duplex bag made of two lighter weight kraft papers formed together. A grocery bag of the same capacity may be manufactured from light-weight kraft paper, 40 lbs. of weight or less, reinforced by the method of the present invention using the apparatus of the invention. Such a bag has at least the same dry tensile strength as a bag made of 75 lb. weight kraft paper, and its tensile strength becomes only slightly less when wet, while a conventional paper bag has negligible tensile strength when wet. Typically, the stripes or strands of extruded plastic forming the reinforcing pattern coating applied to the surface of the paper are 0.060 to 0.080 in width and are at most about 0.001 in thickness after having been vacuum drawn through the mass of the paper and fused. The longitudinal stripes which are designed to reinforce the corners of the paper bags made on paper bag making equipment subsequently are approximately 0.600 to 0.800 in width.

It will be appreciated that the above numerical dimensions are given for illustrative purpose only and that the diamond- or lozenge-shaped pattern applied to the surface of the substrate may be of any appropriate suitable dimensions and shape, may be replaced by any appropriate closed mesh pattern, the smaller the size of the mesh of the pattern, the greater the strength of the substrate sheet material.

It will be further appreciated that although polyolefin resins such as polyethylene and polypropylene are the preferred thermoplastic resins for use in the present invention, other polyolefin resins may be also used as well as polyvinyl chloride, polystyrene, polyoxymethylene, polymethyl methacrylate, polyamides, polyesters, and polycarbonates, for example.

What is claimed as new is as follows:

1. An apparatus for applying to a surface of a relatively thin sheet material in the form of a continuous web a reinforcing pattern of plastic stripes, said apparatus comprising means for linearly translating said web, nozzle means for applying to a surface of said web stripes of extruded plastic, means for oscillating said nozzle means in a direction transverse to the direction of translation of said web for applying said stripes in a mesh-like pattern, suction means disposed below said web for drawing said plastic through said web, means for applying streams of cooling air to said surface coated with said stripes, a catch pan, means for detecting a break in said web, and means for placing said catch pan under said nozzle means upon detection of said break.

2. The apparatus of claim 1 further comprising means for applying pressure to said surface of said web.

3. The apparatus of claim 1 further comprising stationary nozzle means for applying to said surface of said web at least one continuous rectilinear stripe of extruded plastic material.

4. The apparatus of claim 1 wherein nozzle means comprise apertures disposed in an extrusion die, and a support bridge member supporting said extrusion die, said support bridge member being slidably supported at each end proximate an edge of said web, a shaft driven cam and means linking said cam to said bridge support member for oscillating said bridge support member.

5. The apparatus of claim 4 further comprising means biasing said bridge support member to a neutral position.

6. The apparatus of claim 1 wherein said means for applying suction to the lower surface of said web comprises a plate having a plurality of grooves disposed at an angle to the direction of travel of said web, and orifices at the bottom of said groove, said orifices being connected to a source of vacuum.

7. The apparatus of claim 6 wherein said vacuum plate is supported for vertical motion toward and away from said web.

8. The apparatus of claim 7 further comprising means for actuating said vacuum plate away from said web upon detection of a break.

9. The apparatus of claim 1 wherein said means linearly translating said web comprises a pair of pinch rollers located upstream of said air cooling means, said pinch roller means forming said means for applying pressure to said surface of said web.

* * * * *